(12) United States Patent
McGoldrick et al.

(10) Patent No.: US 8,389,089 B2
(45) Date of Patent: *Mar. 5, 2013

(54) PROPYLENE POLYMER PIPES FOR PIPELINES

(75) Inventors: James McGoldrick, Marchtrenk (AT); Siegfried Liedauer, Wilhering (AT); Carl-Gustaf Ek, Vaestra Froelunda (SE)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,312

(22) Filed: Feb. 7, 2011

(65) Prior Publication Data

US 2011/0123751 A1 May 26, 2011

Related U.S. Application Data

(63) Continuation of application No. 10/478,558, filed as application No. PCT/EP02/05549 on May 21, 2002, now abandoned.

(30) Foreign Application Priority Data

May 21, 2001 (EP) .................................. 01112366

(51) Int. Cl.
*B32B 1/08* (2006.01)
*B32B 1/02* (2006.01)
*B32B 1/00* (2006.01)
*B32B 27/32* (2006.01)
*F16L 9/14* (2006.01)

(52) U.S. Cl. ................... 428/36.9; 428/35.7; 428/36.91; 428/36.92; 138/140

(58) Field of Classification Search .................. 428/34.1, 428/35.7, 36.9, 36.91, 36.92; 138/140, DIG. 7
See application file for complete search history.

(56) References Cited

U.S. PATENT DOCUMENTS

| | | | |
|---|---|---|---|
| 4,386,129 A | 5/1983 | Jacoby et al. | |
| 4,606,953 A | 8/1986 | Suzuki et al. | |
| 4,975,469 A | 12/1990 | Jacoby et al. | |
| 4,981,938 A * | 1/1991 | Hanari et al. | 526/351 |
| 5,310,584 A | 5/1994 | Jacoby et al. | |
| 5,362,808 A | 11/1994 | Brosius et al. | |
| 5,387,386 A | 2/1995 | Kirjavainen | |
| 5,681,922 A * | 10/1997 | Wolfschwenger et al. | 528/486 |
| 5,716,998 A * | 2/1998 | Munakata et al. | 521/58 |
| 5,824,714 A | 10/1998 | Broennum et al. | |
| 6,051,638 A | 4/2000 | Auger et al. | |
| 6,169,144 B1 | 1/2001 | Higashi et al. | |
| 6,187,402 B1 | 2/2001 | Ek et al. | |
| 6,235,823 B1 | 5/2001 | Ikeda et al. | |
| 6,251,995 B1 | 6/2001 | Hesse et al. | |
| 6,279,614 B1 | 8/2001 | Riesselmann et al. | |
| 6,433,087 B1 | 8/2002 | Ebner et al. | |
| 6,444,301 B1 | 9/2002 | Davidson et al. | |
| 6,503,993 B1 | 1/2003 | Huovinen et al. | |
| 6,747,103 B1 | 6/2004 | Vestberg et al. | |
| 7,235,203 B2 * | 6/2007 | Sadamitsu et al. | 264/210.7 |
| 2003/0008091 A1 * | 1/2003 | Konrad et al. | 428/36.9 |
| 2003/0157286 A1 | 8/2003 | Hesse et al. | |
| 2004/0157019 A1 | 8/2004 | McGoldrick et al. | |
| 2004/0157969 A1 | 8/2004 | McGoldrick et al. | |
| 2004/0165156 A1 | 8/2004 | Akiyama | |
| 2004/0170790 A1 | 9/2004 | Ek et al. | |
| 2005/0025922 A1 | 2/2005 | Rydin et al. | |
| 2005/0277720 A1 | 12/2005 | Ek et al. | |

FOREIGN PATENT DOCUMENTS

| | | |
|---|---|---|
| DE | 33 19 515 | 11/1984 |
| DE | 199 27 477 | 12/1999 |
| EP | 0 142 724 | 5/1985 |
| EP | 0 190 889 | 8/1986 |
| EP | 0 384 431 | 8/1990 |
| EP | 0 450 342 | 10/1991 |
| EP | 0 557 721 | 9/1993 |
| EP | 0 574 801 | 12/1993 |
| EP | 0 574 804 | 12/1993 |
| EP | 0 634 454 | 1/1995 |
| EP | 0 688 817 | 12/1995 |
| EP | 0 972 801 | 1/2000 |
| EP | 1 174 261 | 1/2002 |
| JP | 60-110717 | 6/1985 |
| JP | 4-135844 | 5/1992 |
| JP | 8-300561 | 11/1996 |
| JP | 8-300562 | 11/1996 |
| JP | 9-227707 | 9/1997 |
| JP | 10-076601 | 3/1998 |
| JP | 2000-044909 | 2/2000 |
| WO | WO-93/12262 | 6/1993 |
| WO | WO-97/33117 | 9/1997 |
| WO | WO-98/43806 | 10/1998 |
| WO | WO-99/35430 | 7/1999 |
| WO | WO 99/40151 * | 8/1999 |

OTHER PUBLICATIONS

Varga et al. "Beta-modification of isotactic polypropylene" in Polypropylene: An A-Z reference, J. Karger-Kocsis ed., Kluwer Academic Publishers, pp. 51-75, 1999.*

* cited by examiner

*Primary Examiner* — Walter B Aughenbaugh
(74) *Attorney, Agent, or Firm* — Jordan and Hamburg LLP

(57) ABSTRACT

Single- or multilayer propylene polymer pipes and pipe components for pipelines with improved resistance to rapid crack propagation made from a propylene homopolymer with a melt index of 0.05 to 10 g/10 min at 230° C./2.16 kg or propylene block copolymer from 90.0 to 99.9 wt % of propylene and 0.1 to 10.0 wt % of a α-olefins with 2 or 4 to 18 carbon atoms with a melt index of 0.05 to 8 g/10 min at 230° C./2.16 kg or mixtures thereof, wherein the propylene homopolymers or propylene block copolymers are β-nucleated propylene polymers, and the propylene polymer pipes for pipelines made from the β-nucleated propylene homopolymers have a rapid crack propagation characterized by a critical temperature of −5 to +40° C. and a critical pressure ≧3 bar below the critical temperature and the propylene polymer pipes made from β-nucleated propylene block copolymers have a rapid crack propagation characterized by a critical temperature of −25 to 0° C. and a critical pressure ≧3 bar below the critical temperature. The propylene polymer pipes with improved resistance to rapid crack propagation are suitable for the transportation of fluids and pressurized fluids such as natural gas, water and the like.

16 Claims, No Drawings

PROPYLENE POLYMER PIPES FOR PIPELINES

STATEMENT OF RELATED APPLICATIONS

The present application is a continuation of U.S. application Ser. No. 10/478, 558, filed Feb. 25, 2004 (now abandoned), which is the U.S. national stage of International Application No. PCT/EP02/05549, filed on May 21, 2002. The disclosures of these applications are incorporated herein by reference.

BACKGROUND OF THE INVENTION

The invention relates to propylene polymer single or multilayer pipes for pipelines with improved resistance to rapid crack propagation as well as to a process for producing them.

Olefin polymer pipes for pipelines consisting of ethylene polymers (Conference Papers "Plastic Pipeline Systems for the Millenium" Göteborg 1998, p. 841-842) or propylene block copolymers (Conference Papers "Plastic Pipeline Systems for the Millenium" Göteborg 1998, p. 611-620, 841-842) are known.

The disadvantage of pipelines made from conventional polypropylene pipes is the insufficient resistance against rapid crack propagation in pressure applications at and below room temperature or even below temperatures up to 40° C. Any small crack formed may propagate many kilometers causing complete destruction of the pipeline with obvious danger to the public. For a service temperature of for example 0° C., pipelines made of conventional polypropylene pipes have a critical pressure of approximately 1 bar, which is considerably below the normal service pressure.

OBJECT OF THE INVENTION

It is the object of the present invention to provide propylene polymer pipes for pipelines and pipeline components such as fittings, electrofusion fittings and valves including electrofusion valves with improved resistance to rapid crack propagation for pressure applications at temperatures below room temperature and particularly also below the freezing point.

BRIEF DESCRIPTION OF THE INVENTION

According to the present invention, this object is achieved by propylene polymer pipes for pipelines with improved resistance to rapid crack propagation comprising a propylene homopolymer with a melt index of 0.05 to 8 g/10 min at 230° C./2.16 kg or propylene block copolymers from 90.0 to 99.9 wt % of propylene and 0.1 to 10.0 wt % of α-olefins with 2 or 4 to 18 carbon atoms with a melt index of 0.05 to 8 g/10 min at 230° C./2.16 kg or mixtures thereof, wherein the propylene homopolymers or propylene block copolymers are β-nucleated propylene polymers, where the β-nucleated propylene homopolymers or the homopolymer block of the β-nucleated propylene block copolymers have an IRτ≧0.97, and the propylene polymer pipes for pipelines made from the β-nucleated propylene homopolymers have a rapid crack propagation characterized by a critical temperature of −5 to +40° C. and a critical pressure≧3 bar below the critical temperature and the propylene polymer pipes made from β-nucleated propylene block copolymers have a rapid stress propagation characterized by a critical temperature of −25 to 0° C. and a critical pressure≧3 bar below the critical temperature.

DETAILED DESCRIPTION OF THE INVENTION

β-nucleated propylene polymers are isotactic propylene polymers composed of chains in a $3_1$ helical conformation having an internal microstructure of β-form spherulites being composed of radial arrays of parallel stacked lamellae. This microstructure can be realized by the addition of β-nucleating agents to the melt and crystallization. The presence of the β-form can be detected through the use of wide angle X-ray diffraction (Moore, J., Polypropylene Handbook, p. 134-135, Hanser Publishers Munich 1996).

Critical temperature and critical pressure are the important safety parameters for pressurized pipelines.

The critical temperature is the temperature, above which it is not possible to produce rapid crack propagation in pressurized pipelines. The critical temperature can be determined according to the S4 (Small Scale Steady State) Test described in ISO 13477, 1997.

The critical pressure is the pressure, under which it is not possible to produce rapid crack propagation (RCP) in pressurized pipelines. The critical pressure is determined at a temperature below the critical temperature as described in ISO 13477, 1997.

In case the RCP test is difficult to perform (dimension of the pipe or design of pipe components) the test according to ISO 13477 should be performed with test pipes with a diameter of 110 mm and a wall thickness of 10 mm manufactured of the same material. Alternatively pipes can be manufactured by milling the pipe or pipe component and further extruding test pipes with diameter of 110 mm and a wall thickness of 10 mm as described and tested according to ISO 13477, 1997.

That is, the lower the critical temperature is, and the higher the critical pressure is, the safer the pipeline is.

The propylene homopolymers and the propylene copolymers according to the present invention have melt indices of 0.05 to 8 g/10 min at 230° C./2.16 kg, preferably 0.1 to 3 g/10 min at 230° C./2.16 kg, most preferably 0.2 to 3 g/10 min at 230° C./2.16 kg.

The single- or multilayer pipes produced by using the propylene homopolymers of the present inventions have a critical temperature of −5 to +40° C., preferably −5 to +20° C., more preferably −5 to +10° C., most preferably −5 to +5° C.

The single- or multilayer pipes produced by using the propylene copolymers of the present inventions have a critical temperature of −25 to 0° C., preferably −25 to −5° C., more preferably −25 to −10° C., most preferably −25 to −15° C.

The single- or multilayer pipes produced by using the propylene homo- and/or copolymers of the present inventions have a critical pressure of ≧3 bar, preferably ≧4 bar, most preferably ≧5 bar below the critical temperature.

Preferably the critical pressure is determined 5° C. below the critical temperature.

According to an advantageous embodiment of the present invention, the β-nucleated propylene polymers used for producing the single- or multilayer pipes and pipe components are β-nucleated propylene homopolymers having an IRτ≧0.98, a tensile modulus≧1500 MPa and a Charpy impact strength, of ≧3 kJ/m² at −20° C. using notched test specimens or the β-nucleated propylene block copolymers having an IRτ of the propylene homopolymer block of ≧0.98, a tensile modulus≧1100 MPa and a Charpy impact strength at −20° C. of ≧6 kJ/m² using notched test specimens.

The IRτ of the propylene polymers is measured and calculated as described in EP 0 277 514 A2 on page 5 (column 7, line 53 to column 8, line 11).

According to a preferred embodiment the β-nucleated propylene homopolymers or the propylene homopolymer block of the β-nucleated propylene block copolymers have an IRτ of ≧0.985. The difference of 0.005 in IRτ, IRτ being a measure for isotacticity, encompasses a significant increase in mechanical polymer properties, especially in stiffness.

According to the present invention the propylene homopolymers show a tensile modulus $\geq 1500$ MPa, preferably $\geq 1600$ MPa and the propylene copolymers show a tensile modulus $\geq 1100$ MPa, preferably $\geq 1300$ MPa and most preferably $\geq 1500$ MPa.

The propylene homopolymers according to the present invention have a Charpy impact strength of $\geq 3$ kJ/m$^2$ at $-20°$ C., preferably 4 to 10 kJ/m$^2$ at $-20°$ C., most preferably 5 to 10 kJ/m$^2$ at $-20°$ C.

The propylene copolymers according to the present invention have a Charpy impact strength of $\geq 6$ kJ/m$^2$ at $-20°$ C., preferably $\geq 9$ kJ/m$^2$ at $-20°$ C., most preferably $\geq 10$ kJ/m$^2$ at $-20°$ C. Charpy impact strength of up to at least 60 kJ/m$^2$ is possible for copolymers according to the invention.

According to an advantageous feature of the present invention, the β-nucleated propylene polymers used for the single- or multilayer pipes and pipe components with an IRτ $\geq 0.98$ are propylene polymers obtained by polymerization with a Ziegler-Natta catalyst system comprising titanium-containing solid components, an organoalumina, magnesium or titanium compound as cocatalyst and an external donor according to the formula

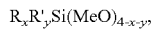

wherein R and R' are identical or different and are branched or cyclic aliphatic or aromatic hydrocarbon residues, and y and x independently from each other are 0 or 1, provided that x+y are 1 or 2.

Examples of propylene polymers with high stereospecifity (e.g. IRτ values) obtained by polymerization with a Ziegler-Natta catalyst system are propylene polymers as described in EP-A-0 790 262, WO 99/24478 and WO 99/16797.

A preferred external donor of the Ziegler-Natta catalyst system for producing the propylene polymers suitable for the inventive propylene polymer to be used in the production of pipes and pipe components is dicyclopentyldimethoxysilane.

According to a preferred embodiment the β-nucleated propylene polymer of the inventive propylene polymer pipes contains 0.01 to 2.0 wt %, in each case based on the propylene polymers used, of dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, preferably N,N'-di-$C_5$-$C_8$-cycloalkyl-2,6-naphthalene dicarboxamide compounds, N,N'-di-$C_5$-$C_8$-cycloalkyl-4,4-biphenyldicarboxamide compounds, N,N'-di-$C_5$-$C_8$-cycloalkyl-terephthalamide compounds, N,N'-di-$C_5$-$C_8$-cycloalkyl-1,4-cyclohexanedicarboxamide compounds and/or N,N'-di-$C_6$-$C_{12}$-aryl-$C_5$-$C_8$-diamide compounds; and/or diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, preferably N,N'—$C_6$-$C_{12}$-arylene-bis-benzamide compounds, N,N'—$C_5$-$C_8$-cycloalkyl-bis-benzamide compounds, N,N'-p-$C_6$-$C_{12}$-arylene-bis-$C_5$-$C_8$-cycloalkylcarboxamide compounds and/or N,N'—$C_5$-$C_8$-cycloalkyl-bis-cyclohexanecarboxamide compounds; and/or amino acid derivative type diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, preferably N-phenyl-5-(N-benzoylamino)pentaneamide and/or N-cyclohexyl-4-N-cyclohexylcarbonylamino)benzamide, as β-nucleating agent.

Examples of N,N'-di-$C_5$-$C_8$-cycloalkyl-2,6-naphthalene dicarboxamide compounds are N,N'-dicyclohexyl-2,6-naphthalene dicarboxamide and N,N'-dicyclooctyl-2,6-naphthalene dicarboxamide.

Examples of N,N'-di-$C_5$-$C_8$-cycloalkyl-4,4-biphenyldicarboxamide compounds are N,N'-dicyclohexyl-4,4-biphenyldicarboxamide and N,N'-dicyclopentyl-4,4-biphenyldicarboxamide.

Examples of N,N'-di-$C_5$-$C_8$-cycloalkyl-terephthalamide compounds are N,N'-dicyclohexylterephthalamide and N,N'-dicyclopentylterephthalamide.

Examples of N,N'-di-$C_5$-$C_8$-cycloalkyl-1,4-cyclohexanedicarboxamide compounds are N,N'-dicyclohexyl-1,4-cyclohexanedicarboxamide and N,N'-dicyclohexyl-1,4-cyclopentanedicarboxamide.

Examples of N,N'-di-$C_6$-$C_{12}$-aryl-$C_5$-$C_8$-diamide compounds are N,N'-bis(p-methylphenyl)hexanediamide, N,N'-bis(4-cyclohexylphenyl)hexanediamide, N,N'-diphenylhexanediamide, N,N'-diphenyloctanediamide and N,N'-bis(p-ethylphenyl)hexanediamide.

Examples of N,N'—$C_6$-$C_{12}$-arylene-bis-benzamide compounds are N,N'-p-phenylene-bis-benzamide and N,N'-1,5-naphthalene-bis-benzamide.

Examples of N,N'—$C_5$-$C_8$-cycloalkyl-bis-benzamide compounds are N,N'-1,4-cyclopentane-bis-benzamide and N,N'-1,4-cyclohexane-bis-benzamide.

Examples of N,N'-p-$C_6$-$C_{12}$-arylene-bis-$C_5$-$C_8$-cycloalkylcarboxamide compounds are N,N'-1,5-naphthalene-bis-cyclohexanecarboxamide and N,N'-1,4-phenylene-bis-cyclohexanecarboxamide.

Examples of N,N'—$C_5$-$C_8$-cycloalkyl-bis-cyclohexanecarboxamide compounds are N,N'-1,4-cyclopentane-bis-cyclohexanecarboxamide and N,N'-1,4-cyclohexane-bis-cyclohexanecarboxamide.

According to a further preferred embodiment the β-nucleated propylene polymer of the inventive propylene polymer pipes contains 0.0001 to 2.0 wt %, in each case based on the propylene polymers used, of quinacridone type compounds, preferably quinacridone, dimethylquinacridone and/or dimethoxyquinacridone; quinacridonequinone type compounds, preferably quinacridonequinone, a mixed crystal of 5,12-dihydro(2,3b)acridine-7,14-dione with quino(2,3b)acridine-6,7,13,14-(5H,12H)-tetrone as disclosed in EP-B 0 177 961 and/or dimethoxyquinacridonequinone; and/or dihydroquinacridone type compounds, preferably dihydroquinacridone, dimethoxydihydroquinacridone and/or dibenzodihydroquinacridone, as β-nucleating agent.

According to a further preferred embodiment the β-nucleated propylene polymer of the inventive propylene polymer pipes contains 0.01 to 2.0 wt %, in each case based on the propylene polymers used, dicarboxylic acid salts of metals from group IIa of periodic system, preferably pimelic acid calcium salt and/or suberic acid calcium salt; and/or mixtures of dicarboxylic acids and salts of metals from group IIa of periodic system, as β-nucleating agent.

According to a further preferred embodiment the β-nucleated propylene polymer of the inventive propylene polymer pipes contains 0.01 to 2.0% by weight, in each case based on the propylene polymers used, salts of metals from group IIa of periodic system and imido acids of the formula

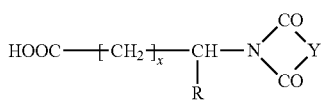

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, preferably calcium salts of phthaloylglycine, hexahydrophthaloylglycine, N-phthaloylalanine and/or N-4-methylphthaloylglycine, as β-nucleating agent.

The inventive propylene polymers used for producing pipes for pipelines may further contain usual auxiliary materials for example 0.01 to 2.5 wt % stabilizers and/or 0.01 to 1 wt % processing aids and/or 0.1 to 1 wt % antistatic agents and/or 0.2 to 3 wt % pigments, in each case based on the propylene polymers used.

As stabilizers preferably mixtures of 0.01 to 0.6 wt % phenolic antioxidants, 0.01 to 0.6 wt % 3-arylbenzofuranones, 0.01 to 0.6 wt % processing stabilizers based on phosphites, 0.01 to 0.6 wt % high temperature stabilizers based on disulfides and thioethers and/or 0.01 to 0.8 wt % sterically hindered amines (HALS) are suitable.

A still further object of the present invention is a process for producing propylene polymer pipes and pipe components for pipelines with improved resistance to rapid crack propagation from a propylene homopolymer with a melt index of 0.05 to 8 g/10 min at 230° C./2.16 kg or propylene block copolymers from 90.0 to 99.9 wt % of propylene and 0.1 to 10.0 wt % of α-olefins with 2 or 4 to 18 carbon atoms with a melt index of 0.05 to 8 g/10 min at 230° C./2.16 kg or mixtures thereof, wherein the propylene homopolymers or propylene block copolymers are β-nucleated propylene polymers, and the propylene polymer pipes for pipelines made from the β-nucleated propylene homopolymers have a rapid crack propagation characterized by a critical temperature of −5 to +40° C. and a critical pressure≧3 bar below the critical temperature and the propylene polymer pipes and pipe components made from β-nucleated propylene block copolymers have a rapid crack propagation characterized by a critical temperature of −25 to 0° C. and a critical pressure≧3 bar below the critical temperature.

For producing the inventive single- or multilayer propylene polymer pipes and pipe components for pipelines conventional extruders or injection molding machines are suitable. For example, extruders with short compression screws or 3-zone screws with L/D 20 to 40 are suitable for melting the propylene polymer pursuant to the inventive method. Preferably, 5-zone screws with a feed zone, compression zone, shear zone, decompression zone and homogenizing zone are preferred. Screws with cutting depths of 1:2.5 to 1:3.5 are particularly suitable. Extruders equipped with a grooved barrel section are also suitable. Optionally, a melt pump and/or a static mixer can be used additionally between the extruder and the ring die head. Ring shaped dies with diameters ranging from approximately 16 to 2000 mm and greater are possible. Advantageous die temperatures for discharging the melt are 190 to 240° C. After leaving the ring-shaped die, the polyolefin pipes are taken off over a vacuum calibrating sleeve, and cooled.

Pipes could be manufactured by other extrusion processes such as injection molding, extrusion winding, rotor molding and blow molding and other appropriate processes.

Preferred applications of the propylene polymer pipes for pipelines are the conveyance of fluids and pressurized fluids such as natural gas and water and the like at service temperatures below room temperature and particularly also below the freezing point when applicable.

EXAMPLES

The following tests were made using injection molded test specimens prepared according to ISO 1873.

Tensile modulus according to ISO 527 (cross head speed 1 mm/min) at +23° C.

Charpy impact strength, notched, according to ISO 179/1eA at −20° C.

Rapid crack propagation test on extruded pipes according to ISO 13477

Example 1

1.1 Preparation of the β-Nucleated Propylene Polymer

A mixture of
90% by weight of a propylene block copolymer, obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.985, and a melt index of 0.30 g/10 min at 230° C./2.16 kg,
10% by weight of a master batch comprising 99 parts by weight of a propylene block copolymer having an ethylene content of 8.3% by weight, an IRτ of the propylene homopolymer block of 0.985, and a melt index of 0.30 g/10 min at 230° C./2.16 kg, and 1 part by weight of pimelic acid calcium salt, and 0.1 wt % calcium stearate, 0.1 wt % tetrakis [methylene(3,5-di-t-butylhydroxyhydrocinnamate)]methane and 0.1 wt % tris-(2,4-di-t-butylphenyl)phosphite, based on the sum of the propylene polymers used, is melted in a twin screw extruder with a temperature profile of 100/145/185/210/220/225/225/225/220/200/185° C., homogenized, discharged and pelletized.

The resulting polypropylene polymer has a melt index of 0.32 g/10 min at 230° C./2.16 kg, a tensile modulus of 1290 MPa and a Charpy impact strength, using notched test specimens, of 39 kJ/m² at −20° C.

1.2 Manufacture of the Propylene Polymer Pipe for Pipelines

For producing the propylene polymer pipes for pipelines, the β-nucleated propylene polymer of 1.1 is introduced in a single screw extruder (L/D=30, D=70 mm, temperature profile 200/210/220/220/220/220/200° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at 20° C., the taking off velocity being 0.3 m/min.

Rapid crack propagation test shows a critical temperature of −21° C. and a critical pressure of 8 bar at −26° C.

Example 2

2.1 Preparation of the β-Nucleated Propylene Polymer

A mixture of
94% by weight of a propylene homopolymer, obtained by bulk polymerization using a Ziegler-Natta catalyst system with dicyclopentyldimethoxysilane as external donor, having an IRτ of 0.985, and a melt index of 1.1 g/10 min at 230° C./2.16 kg, 6% by weight of a master batch comprising 99.8 parts by weight of a propylene block copolymer having an ethylene content of 8.3 wt %, an IRτ of the propylene homopolymer block of 0.985 and a melt index of 0.30 g/10 min at 230° C./2.16 kg, and 0.2 parts by weight of a mixed crystal of 5,12-dihydro(2,3b)acridine-7,14-dione with quino(2,3b) acridine-6,7,13,14-(5H,12H)-tetrone, and 0.05 wt % calcium stearate, 0.1 wt % tetrakis[methylene(3,5-di-t-butyl-hydroxyhydrocinnamate)]methane and 0.1 wt % tris-(2,4-di-t-butyl-phenyl)-phosphite, based on the sum of the propylene polymers used, is melted in a twin screw extruder with a temperature profile of 100/145/190/215/225/230/230/215/ 205/190° C., homogenized, discharged and pelletized.

The resulting polypropylene polymer has a melt index of 1.0 g/10 min at 230° C./2.16 kg, a tensile modulus of 1500 MPa and a Charpy impact strength, using notched test specimens, of 11 kJ/m² at −20° C.

2.2. Manufacture of the Propylene Polymer Pipe for Pipelines

For producing the propylene polymer pipes for pipelines, the β-nucleated propylene polymer of 2.1 is introduced in a single screw extruder (L/D=30, D=70 mm, temperature profile 200/210/225/225/225/225/205° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at 20° C., the taking off velocity being 0.35 m/min.

Rapid Crack Propagation test results a critical temperature of −5° C. and a critical pressure of 5 bar at −10° C.

Example 3

3.1 Preparation of the β-Nucleated Propylene Polymer

A mixture of
75% by weight of a propylene block copolymer obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.985 and a melt index of 0.30 g/10 min at 230° C./2.16 kg,
25% by weight of a master batch comprising 99.5 parts by weight of a propylene block copolymer having an ethylene content of 8.3 wt %, an IRτ of the propylene homopolymer block of 0.985, and a melt index of 0.30 g/10 min at 230° C./2.16 kg, and 0.5 parts by weight of hexahydrophthaloylglycine calcium salt, and 0.1 wt % calcium stearate, 0.1 wt % tetrakis[methylene(3,5-di-t-butylhydroxyhydrocinnamate)] methane and 0.1 wt % of tris-(2,4-di-t-butylphenyl)phosphite, based on the sum of the propylene polymers used, is melted in a twin screw extruder with a temperature profile of 100/145/185/210/220/225/225/200/185° C., homogenized, discharged and pelletized.

The resulting polypropylene polymer has a melt index of 0.32 g/10 min at 230° C./2.16 kg, a tensile modulus of 1310 MPa and a Charpy impact strength, notched, of 37 kJ/m² at −20° C.

3.2 Manufacture of the Propylene Polymer Pipe for Pipelines

For producing the propylene polymer pipes for pipelines, the β-nucleated propylene polymer of 3.1 is introduced in a single screw extruder (L/D=30, D=70 mm, temperature profile 200/210/220/220/220/220/200° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at 20° C., the taking off velocity being 0.3 m/min.

Rapid Crack Propagation test results a critical temperature of −19° C. and a critical pressure of 7 bar at −24° C.

Example 4

4.1 Preparation of the β-Nucleated Propylene Polymer

A mixture of
95 wt % of a propylene homopolymer, obtained by gas phase polymerization using a Ziegler-Natta catalyst system with dicyclopentyldimethoxysilane as external donor, having an IRτ of 0.987, and a melt index of 1.1 g/10 min at 230° C./2.16 kg,
5 wt % of a master batch comprising 97.5 parts by weight of a propylene homopolymer having an IRτ of 0.987, and a melt index of 4.2 g/10 min at 230° C./2.16 kg, and 2.5 parts by weight of N,N'-dicyclohexyl-2,6-naphthalene dicarboxamide, and 0.05 wt % calcium stearate, 0.1 wt % tetrakis[methylene(3,5-di-t-butylhydroxyhydrocinnamate)]-methane and 0.1 wt % tris-(2,4-di-t-butylphenyl)phosphite, based on the sum of the propylene polymers used, is melted in a twin screw extruder with a temperature profile of 100/145/190/215/225/ 225/225/205/190° C., homogenized, discharged and pelletized.

The resulting polypropylene polymer has a melt index of 1.2 g/10 min at 230° C./2.16 kg, a tensile modulus of 1765 MPa and a Charpy impact strength, using notched test specimens, of 5.5 kJ/m² at −20° C.

4.2 Manufacture of the Propylene Polymer Pipe for Pipelines

For producing the propylene polymer pipes for pipelines, the β-nucleated propylene polymer of 4.1 is introduced in a single screw extruder (L/D=30, D=70 mm, temperature profile 200/210/225/225/225/225/205° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at 20° C., the taking off velocity being 0.35 m/min.

Rapid Crack Propagation test results a critical temperature of +2.5° C. and a critical pressure of 5 bar at −2.5° C.

The invention claimed is:
1. Propylene polymer single- or multilayer pipes and pipe components for pipelines having improved resistance to rapid crack propagation comprising a propylene homopolymer having a melt index of 0.05 to 8 g/10 min at 230° C./2.16 kg or propylene block copolymers of 90.0 to 99.9 wt % propylene and 0.1 to 10.0 wt % α-olefins of 2 or 4 to 18 carbon atoms having a melt index of 0.05 to 8 g/10 min at 230° C./2.16 kg or mixtures thereof, wherein the propylene homopolymers or propylene block copolymers are β-nucleated, wherein the β-nucleated propylene homopolymers or the homopolymer block of the β-nucleated propylene block copolymers have an IRτ≧0.97 and the propylene polymer pipes and pipe components for pipelines comprised of the β-nucleated propylene homopolymers have a rapid crack propagation with a critical temperature range of −5 to +40° C. and a critical pressure range≧3 bar when tested below the critical temperature and the propylene polymer pipes and pipe components comprised of the β-nucleated propylene block copolymers have a rapid crack propagation with a criti- cal temperature range of −25 to 0° C. and a critical pressure range of ≧3 bar when tested below the critical temperature.

2. Propylene polymer pipes and pipe components according to claim 1, wherein the β-nucleated propylene polymers of the propylene polymer pipes are β-nucleated propylene homopolymers having an IRτ≧0.98, a tensile modulus≧1500 MPa at +23° C. and a Charpy impact strength of ≧3 kJ/m² at −20° C. using notched test specimens or β-nucleated propylene block copolymers having an IRτ of the propylene homopolymer block of ≧0.98, a tensile modulus≧1100 MPa at 23° C. and a Charpy impact strength at −20° C. of ≧6 kJ/m² using notched test specimens.

3. Propylene polymer pipes according to claim 2, wherein the β-nucleated propylene polymers having an IRτ≧0.98 are obtained by polymerization with a Ziegler-Natta catalyst system comprising titanium-containing solid components, an organoalumina, magnesium or titanium compound as cocatalyst and an external donor according to the formula

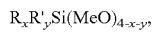

wherein R and R' are identical or different and are branched or cyclic aliphatic or aromatic hydrocarbon residues, and y and x independently from each other are 0 or 1, provided that x+y are 1 or 2.

4. Propylene polymer pipes and pipe components according to claim 3, wherein the external donor is dicyclopentyldimethoxysilane.

5. Propylene polymer pipes and pipe components of claim 1, wherein the β-nucleated propylene polymers contain 0.01 to 2.0 wt %, in each case based on the propylene polymers, of
dicarboxylic acid derivative diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids; and/or
diamine derivative diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines; and/or
amino acid derivative diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, as β-nucleating agent.

6. Propylene polymer pipes and pipe components of claim 1, wherein the β-nucleated propylene polymers contain 0.0001 to 2.0 wt %, based on the propylene, quinacridone compounds, quinacridonequinone compounds, and/or dihydroquinacridone compounds, as β-nucleating agent.

7. Propylene polymer pipes of claim 1, wherein the β-nucleated propylene polymers contain 0.01 to 2.0 wt %, based on the propylene, dicarboxylic acid salts of metals from group IIa of the periodic system, and/or mixtures of dicarboxylic acids and salts of metals from group IIa of the periodic system, as β-nucleating agent.

8. Propylene polymer pipes of claim 1, wherein the β-nucleated propylene polymers contain 0.01 to 2.0 wt %, based on the propylene, salts of metals from group IIa of the periodic system and imido acids of the formula

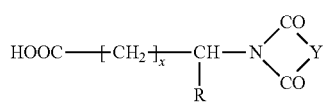

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, as β-nucleating agent.

9. Pipelines comprising the pipes and pipe components of claim 1.

10. Propylene polymer pipes and pipe components of claim 5, wherein the dicarboxylic acid derivative diamide compounds are N,N'-di-$C_5$-$C_8$-cycloalkyl-2,6-naphthalene dicarboxamide compounds, N,N'-di-$C_5$-$C_8$-cycloalkyl-4,4-biphenyldicarboxamide compounds, N,N'-di-$C_5$-$C_8$-cycloalkylterephthalamide compounds, N,N'-di-$C_5$-$C_8$-cycloalkyl-1,4-cyclohexanedicarboxamide compounds and/or N,N'-di-$C_6$-$C_{12}$-aryl-$C_5$-$C_8$-diamide compounds, the diamine derivative diamide compounds are N,N'—$C_6$-$C_{12}$-arylene-bis-benzamide compounds, N,N'—$C_5$-$C_8$-cycloalkyl-bis-benzamide compounds, N,N'-p-$C_6$-$C_{12}$-arylene-bis-$C_5$-$C_8$-cycloalkylcarboxamide compounds and/or N,N'—$C_5$-$C_8$-cycloalkyl-bis-cyclohexanecarboxamide compounds, and the amino acid derivative diamide compounds are N-phenyl-5-(-benzoylamino)pentaneamide and/or -cyclohexyl-4-cyclohexylcarbonylamino)benzamide.

11. Propylene polymer pipes and pipe components of claim 6, wherein the quinacridone compounds are quinacridone, dimethylquinacridone and/or dimethoxyquinacridone, the quinacridonequinone compounds are quinacridonequinone, a mixed crystal of 5,12-dihydro(2,3b)acridine-7,14-dione with quino(2,3b)acridine-6,7,13,14-(5H,12H)-tetrone and/or dimethoxyquinacridonequinone, and the dihydroquinacridone compounds are dihydroquinacridone, dimethoxydihydroquinacridone and/or dibenzodihydroquinacridone.

12. Propylene polymer pipes and pipe components of claim 7, wherein the dicarboxylic acid salts of group IIa of the periodic system are pimelic acid calcium salt and/or suberic acid calcium salt.

13. Propylene polymer pipes and pipe components of claim 8, wherein the salts of metals of group IIa of the periodic system are calcium salts of phthaloylglycine, hexahydrophthaloylglycine, N-phthaloylalanine and/or N-4-methylphthaloylglycine.

14. The propylene polymer single- or multilayer pipes and pipe components of claim 1, wherein the propylene homopolymer further comprises 0.001 to 2.0 wt-% of a β-nucleating agent that is a calcium salt of a carboxylic acid selected from the group consisting of pimelic acid, suberic acid, or a mixture of pimelic acid and suberic acid.

15. Propylene polymer single- or multilayer pipes and pipe components for pipelines having improved resistance to rapid crack propagation comprising a propylene homopolymer having a melt index of 0.05 to 8 g/10 min at 230° C./2.16 kg, wherein the propylene homopolymer is β-nucleated, wherein the β-nucleated propylene homopolymer has an IRτ≧0.97 and the propylene polymer pipes and pipe components for pipelines comprised of the β-nucleated propylene homopolymer have a rapid crack propagation with a critical temperature range of −5 to +40° C. and a critical pressure range≧3 bar when tested below the critical temperature.

16. The propylene polymer single- or multilayer pipes and pipe components of claim 15, wherein the propylene homopolymer further comprises 0.001 to 2.0 wt-% of a β-nucleating agent that is a calcium salt of a carboxylic acid selected from the group consisting of pimelic acid, suberic acid, or a mixture of pimelic acid and suberic acid.

* * * * *